No. 839,817. PATENTED JAN. 1, 1907.
F. A. DECKER.
COUPLING FOR BATTERY ELEMENTS.
APPLICATION FILED JAN. 22, 1906.

WITNESSES:

INVENTOR
Frank A. Decker
BY
Charles N. Butler
ATTORNEY.

UNITED STATES PATENT OFFICE.

FRANK A. DECKER, OF PHILADELPHIA, PENNSYLVANIA, ASSIGNOR, BY MESNE ASSIGNMENTS, TO DECKER ELECTRICAL MANUFACTURING COMPANY, OF WILMINGTON, DELAWARE.

COUPLING FOR BATTERY ELEMENTS.

No. 839,817.

Specification of Letters Patent.

Patented Jan. 1, 1907.

Application filed January 22, 1906. Serial No. 297,140.

*To all whom it may concern:*

Be it known that I, FRANK A. DECKER, a citizen of the United States, and a resident of Philadelphia, in the county of Philadelphia and State of Pennsylvania, have invented certain Improvements in Couplings for Battery Elements, of which the following is a specification.

This invention is an improved coupling for battery elements, providing means whereby such elements can be readily connected and disconnected, both electrically and mechanically, with relation to the cell in which they are used.

In its preferred form it comprises, generally stated, an electrode-holder with a tapered ear secured to the element to be mechanically and electrically connected thereby.

Figure 4:
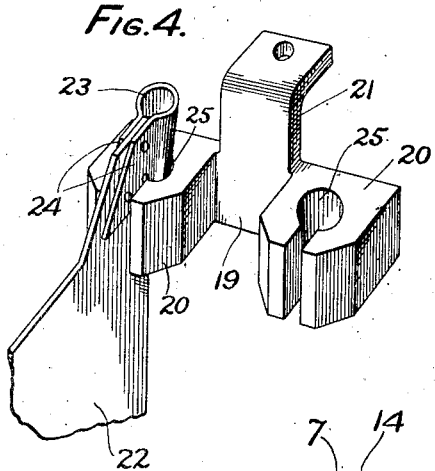
Figure 1:
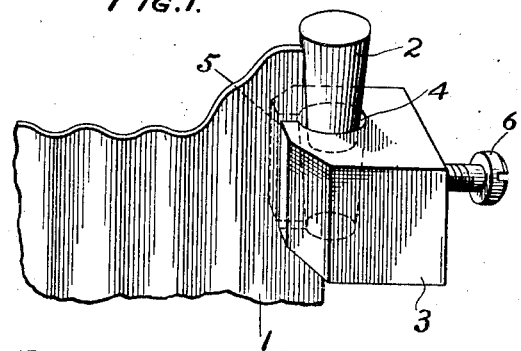
Figure 2:
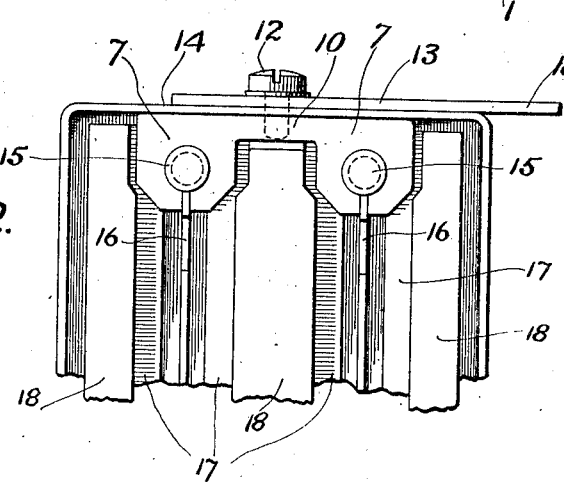
Figure 3:
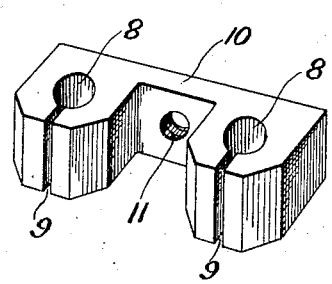
Figure 5:
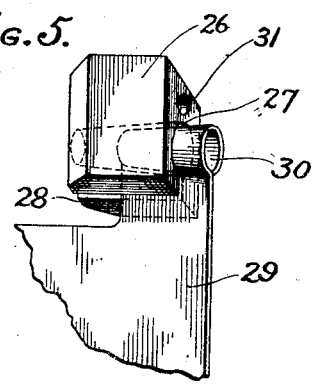

In the accompanying drawings, Figure 1 represents a perspective view of the invention. Fig. 2 is a plan view representing a developed form of the construction shown in Fig. 1. Fig. 3 is a perspective view of the terminal holder shown in Fig. 2. Fig. 4 is a perspective view of a modified form of the construction shown in Fig. 2, and Fig. 5 is a perspective view of a modified form of the construction shown in Fig. 1.

In the form of the invention shown in Fig. 1 the plate 1 has fixed thereon the ear 2 in the form of a tapered plug, and the holder 3 of suitable conducting material has therein the tapered socket 4, which receives the ear, and the slot 5, which receives the plate, the part 3 having a binding-screw 6 set therein for securing it to the envelop and the conductor. As illustrated, the ear is partly inserted in the socket and in its final position makes a close connection therewith.

In Figs. 2 and 3 is shown a compound form of the holder comprising the parts 7, containing the sockets 8 and the slots 9, which are connected by the part 10, having the threaded hole 11 tapped therein. A binding-screw 12, passing through the conductor 13 and the envelop 14, secures the holder in place by engagement in the hole 11. The tapered plugs 15 are engaged in the corresponding sockets 8 and support the plates 16, fixed thereto and held thereby in the cups 17, having on either side thereof and supported thereby the electrodes 18.

In Fig. 4 is shown a compound holder in which the part 19, connecting the parts 20, has thereon the lug 21, while the element 22 is provided with a tapered ear 23, bent up from sheet metal, with the straps 24 thereon riveted to the plate, each socket 25 of the holder receiving an ear 23, which enters, as shown, and drops down to a tight connection.

In the foregoing preferred constructions the plug and the socket taper downwardly in the direction of their extension, being joined and separated by moving them vertically in the direction of their axes and parallel to the direction of movement of the plate in inserting and withdrawing it, the weight of the plate acting to force them together along the line of their axes.

In Fig. 5 is shown a construction in which the holder 26 has the horizontally-disposed socket 27 therein tapering from the back to the front and opening through the vertical slot 28, and the plate 29 has the horizontally-disposed ear 30, turned up to tapered form from the metal thereof, on which the holder is adapted to be slipped, a threaded hole 31 in the holder providing means for engaging it in position by means of a binding-screw.

Having described my invention, I claim—

1. A coupling for battery parts comprising, in combination with a plate, a device fixed to said plate and a second device for engaging and holding said first device, said devices being forced one within the other and held in close relation by the weight of the plate.

2. A coupling comprising a tapered socket and a tapered plug, in combination with a plate secured to one of said parts, and an envelop and conductor secured to the other of said parts, the axes of said socket and plug being disposed vertically in their assembled relation.

3. A battery-electrode holder having a tapered socket and a slit therein, an envelop and a conductor to which said holder is engaged, and an electrode having an ear thereon which fits said socket and has its connection with said electrode disposed in said slot.

In testimony whereof I have hereunto set my hand, this 19th day of January, 1906, in the presence of the subscribing witnesses.

FRANK A. DECKER.

Witnesses:
ROBERT JAMES EARLEY,
JOSEPH M. KERTLAND.